(12) United States Patent
Davydov et al.

(10) Patent No.: US 11,489,637 B2
(45) Date of Patent: Nov. 1, 2022

(54) DOWNLINK WAVEFORM TYPE AND GUARD INTERVAL ADAPTATION FOR WIRELESS SYSTEM

(71) Applicant: APPLE INC., Cupertino, CA (US)

(72) Inventors: Alexei Davydov, Nizhny Novgorod (RU); Gang Xiong, Portland, OR (US); Gregory V. Morozov, Nizhny Novgorod (RU); Yushu Zhang, Heilongjiang (CN); Dae Won Lee, Portland, OR (US)

(73) Assignee: APPLE INC., Cupertino, CA (US)

( * ) Notice: Subject to any disclaimer, the term of this patent is extended or adjusted under 35 U.S.C. 154(b) by 26 days.

(21) Appl. No.: 17/265,429

(22) PCT Filed: Aug. 9, 2019

(86) PCT No.: PCT/US2019/046001
§ 371 (c)(1),
(2) Date: Feb. 2, 2021

(87) PCT Pub. No.: WO2020/033891
PCT Pub. Date: Feb. 13, 2020

(65) Prior Publication Data
US 2021/0297204 A1    Sep. 23, 2021

Related U.S. Application Data

(60) Provisional application No. 62/717,566, filed on Aug. 10, 2018.

(51) Int. Cl.
*H04L 5/00* (2006.01)
*H04W 72/04* (2009.01)
*H04W 72/12* (2009.01)

(52) U.S. Cl.
CPC .......... *H04L 5/0007* (2013.01); *H04L 5/0037* (2013.01); *H04W 72/048* (2013.01); *H04W 72/1273* (2013.01)

(58) Field of Classification Search
CPC . H04L 5/0007; H04L 5/0037; H04L 27/2627; H04L 27/0008; H04L 25/03;
(Continued)

(56) References Cited

U.S. PATENT DOCUMENTS

2016/0142292 A1* 5/2016 Au .................. H04W 4/50
                                                      370/352
2018/0049233 A1   2/2018 Luo et al.
(Continued)

FOREIGN PATENT DOCUMENTS

EP     2259654 A1   12/2010
WO   2007146561 A2  12/2007
(Continued)

OTHER PUBLICATIONS

3GPP TS 38.214,"3rd Generation Partnership Project; Technical Specification Group Radio Access Network; NR; Physical layer procedures for data (Release 15)", V15.2.0, Jun. 29, 2018, 95 pages.
(Continued)

*Primary Examiner* — Sharmin Chowdhury

(57) ABSTRACT

Technology for a Next Generation NodeB (gNB) operable to adapt to a downlink waveform type for wireless transmissions is disclosed. The gNB can encode an indicator of a downlink waveform type of a plurality of downlink waveform types for transmission to a user equipment (UE). The gNB can encode 5 a downlink signal for transmission on a downlink physical channel to the UE using the indicated downlink waveform type in a wireless system operating above a 52.6 gigahertz (GHz) carrier frequency.

16 Claims, 11 Drawing Sheets

(58) Field of Classification Search
CPC .......................... H04L 27/26; H04W 72/048; H04W 72/1273; H04W 72/12
See application file for complete search history.

(56) References Cited

U.S. PATENT DOCUMENTS

| | | | |
|---|---|---|---|
| 2018/0062902 A1 | 3/2018 | Gagiev et al. | |
| 2018/0294916 A1* | 10/2018 | Akkarakaran | H04W 76/27 |
| 2019/0261315 A1* | 8/2019 | Zhang | H04L 5/0028 |
| 2020/0092061 A1* | 3/2020 | Wang | H04L 5/00 |
| 2020/0120488 A1* | 4/2020 | Liu | H04W 72/04 |

FOREIGN PATENT DOCUMENTS

| | | | |
|---|---|---|---|
| WO | WO-2016114824 A1 * | 7/2016 | H04L 27/2602 |
| WO | 2017052424 A1 | 3/2017 | |
| WO | 2018064306 A1 | 4/2018 | |
| WO | 2018136298 A1 | 7/2018 | |

OTHER PUBLICATIONS

PCT/US2019/046001, International Search Report and Written Opinion, dated Nov. 28, 2019, 10 pages.
Qualcomm, "Motivation paper for SI on NR waveform beyond 52.6GHz", RP-180452, 3GPP RAN #79, Chennai, India, Agenda Item 9.1.2 (Resubmission of RP-172635), Mar. 19-22, 2018.
Alcatel-Lucent, "Discussion of the RS for additional carrier types for carrier aggregation enhancement", R4-122883, 3GPP TSG-RAN WG4 Meeting #63, Prague, Czech Republic, Agenda Item 6.13.3, Apr. 21-25, 2012, 3 pages.
Samsung, "Support of Different Numeralogies for Same Vertical", R1-1609047, 3GPP TSG RAN WG1 #86bis, Lisbon, Portugal, Agenda Item 8.1.6.1, Oct. 10-14, 2016, 3 pages.

* cited by examiner

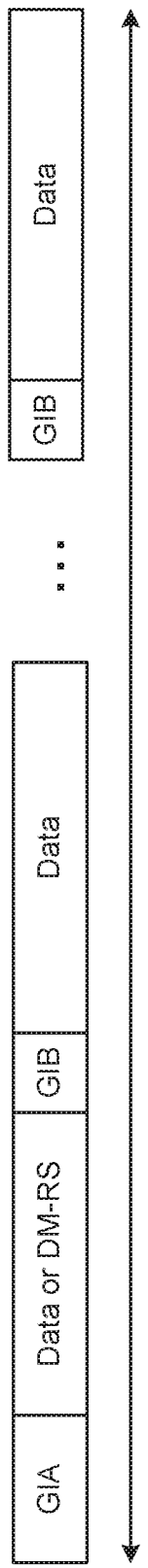

DOWNLINK WAVEFORM TYPE AND GUARD INTERVAL ADAPTATION FOR WIRELESS SYSTEM

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 5 illustrates non-uniform GI lengths within one slot in accordance with an example;

FIG. 6 illustrates Abstract Syntax Notation (ASN) code for a bandwidth part (BWP) configuration in accordance with an example;

FIG. 7 is a table of phase tracking reference signal (PT-RS) densities and corresponding guard interval lengths in accordance with an example;

Figure 1:
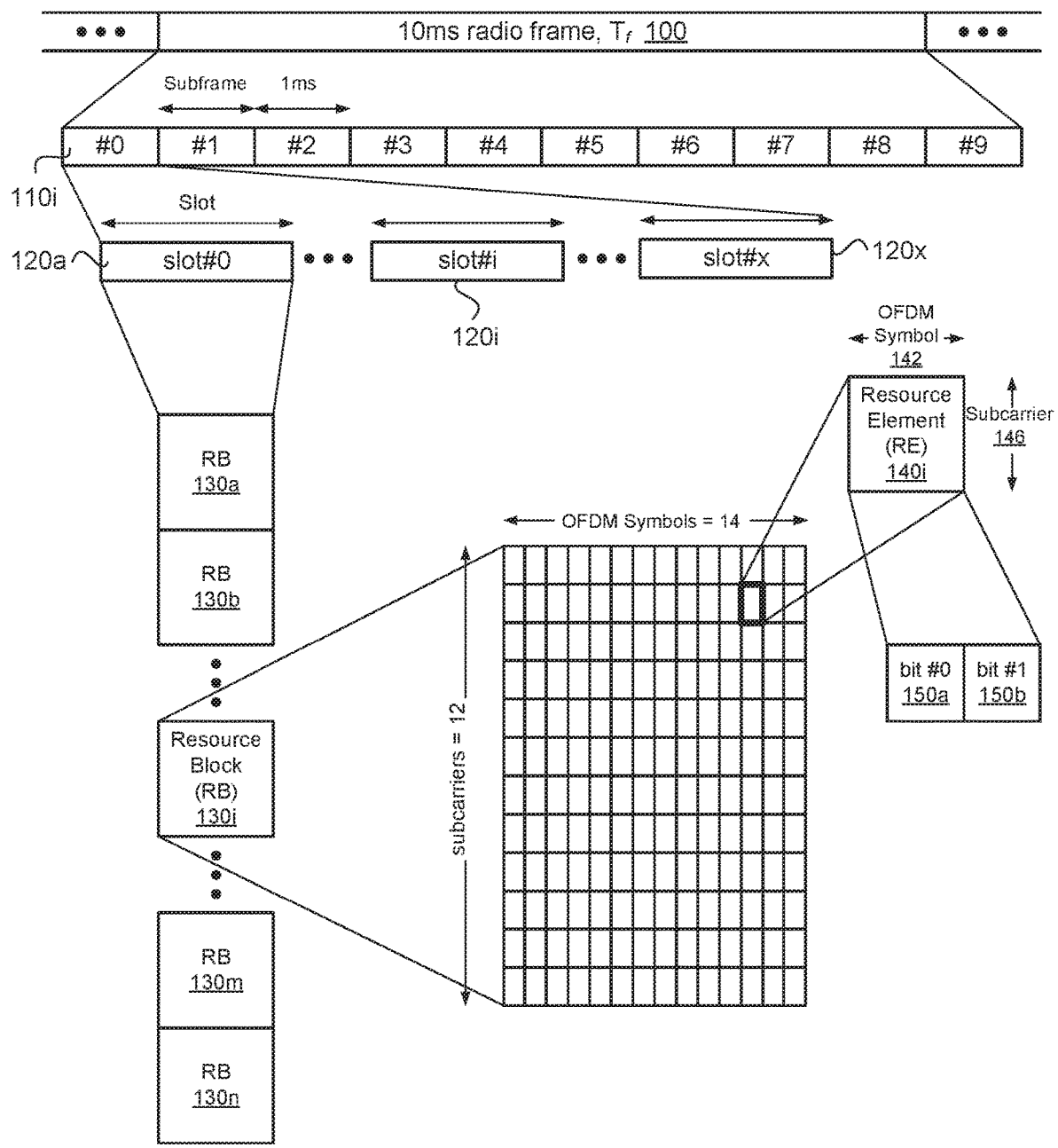
FIG. 1 illustrates a block diagram of a Third-Generation Partnership Project (3GPP) New Radio (NR) Release 15 frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," "New Radio Base Stations (NR BS) and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 provides an example of a 3GPP NR Release 15 frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into one or multiple slots 120$a$, 120$i$, and 120$x$, each with a duration, $T_{slot}$, of 1/μ ms, where μ=1 for 15 kHz subcarrier spacing, μ=2 for 30 kHz, μ=4 for 60 kHz, μ=8 for 120 kHz, and u=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130a, 130b, 130i, 130m, and 130n based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140i can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP NR Release 15 frame structure provides examples of the way in which data is transmitted, or the transmission mode. The example is not intended to be limiting. Many of the Release 15 features will evolve and change in the 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

Mobile communication has evolved significantly from early voice systems to today's highly sophisticated integrated communication platform. The next generation wireless communication system, 5G, or new radio (NR) will provide access to information and sharing of data by various users and applications. NR is expected to be a unified network/system that is targeted to meet different and sometime conflicting performance dimensions and services. Such diverse multi-dimensional specifications are driven by different services and applications. In general, NR will evolve based on 3GPP LTE-Advanced with additional potential new Radio Access Technologies (RATs) to enrich people's lives with better, simple and seamless wireless connectivity solutions. NR will enable everything connected by wireless and deliver fast, rich contents and services.

The NR Release 15 system design is based on carrier frequencies up to 52.6 GHz with a waveform choice of cyclic prefix orthogonal frequency-division multiplexing (CP-OFDM) for downlink (DL) and uplink (UL), and additionally, Discrete Fourier Transform-spread-OFDM (DFT-s-OFDM) for UL. However, for a carrier frequency above 52.6 GHz, it is envisioned that a single carrier based waveform is needed in order to handle issues including low power amplifier (PA) efficiency and large phase noise.

For a single carrier based waveform, DFT-s-OFDM and single carrier with frequency domain equalizer (SC-FDE) can be considered for both DL and UL.

Figure 2:
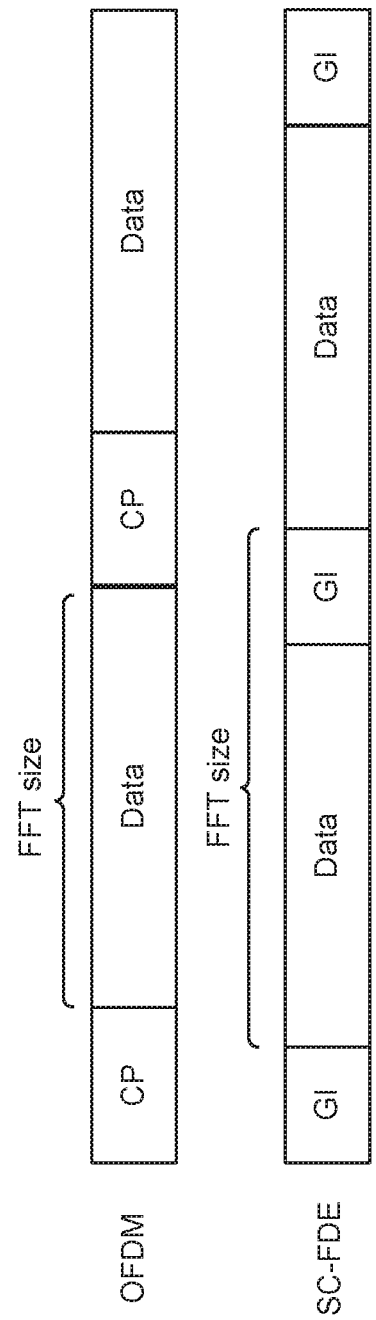
FIG. 2 is a comparison between orthogonal frequency-division multiplexing (OFDM) and single carrier with frequency domain equalizer (SC-FDE) transmission schemes in accordance with an example.

FIG. 2 is an example of a comparison between OFDM and SC-FDE transmission schemes. For the OFDM based transmission scheme including DFT-s-OFDM, a cyclic prefix (CP) can be inserted at the beginning of each block, where a last data symbols in a block can be repeated as the CP. Typically, a length of the CP can exceed a maximum expected delay spread in order to overcome inter-symbol interference (ISI). For the SC-FDE transmission scheme, a known sequence (guard interval (GI), unique word (UW), etc.) can be inserted at both the beginning and end of one block or a CP can be inserted at the beginning of one block. Further, a linear equalizer in the frequency domain can be employed to reduce a receiver complexity. Compared to OFDM, the SC-FDE transmission scheme can reduce a peak to average power ratio (PAPR) and thus allow the use of a less costly power amplifier.

Figure 3:
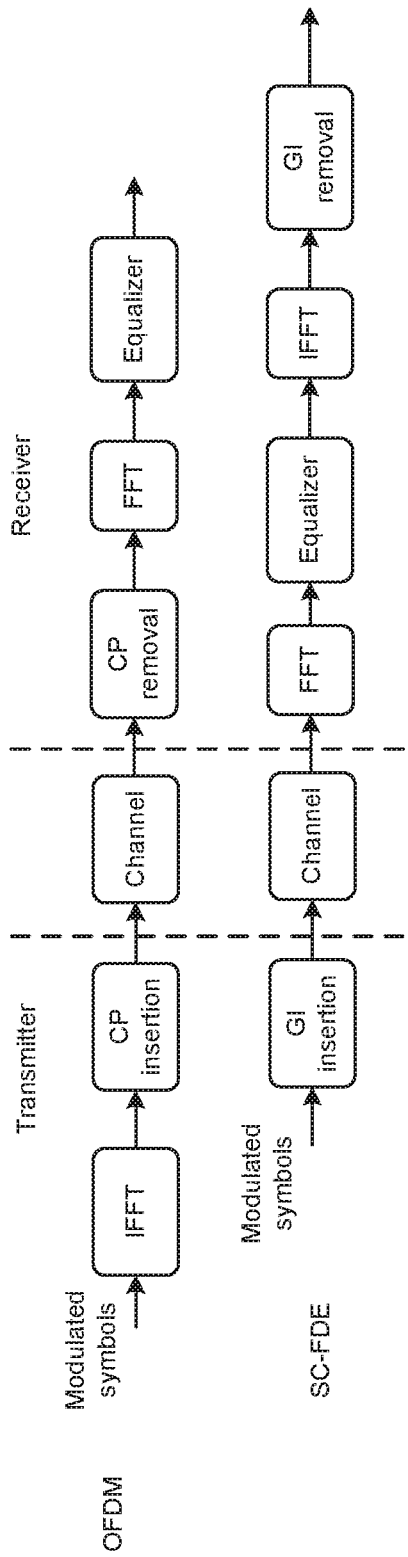
FIG. 3 illustrates transmitter and receiver structures for OFDM and SC-FDE in accordance with an example.

FIG. 3 illustrates an example of transmitter and receiver structures for OFDM and SC-FDE. As shown, for OFDM, at a transmitter, an inverse fast Fourier transform (IFFT) and a CP insertion can be applied to a signal (which comprises of modulated symbols), and at a receiver, CP removal and a fast Fourier transform (FFT) can be applied to the signal. For SC-FE, at the transmitter, guard interval (GI) or a CP can be applied, and at the receiver, FFT, IFFT and GI or CP removal can be applied to the signal.

In one example, for the SC-FDE transmission scheme, at the receiver, a fast Fourier transform (FFT) can be applied to convert a received signal from a time domain to a frequency domain. Subsequently, a linear equalizer can be performed in the frequency domain and followed by an inverse fast Fourier transform (IFFT) to covert the signal from the frequency domain back to the time domain.

In one example, when more than one waveform type, e.g., CP-OFDM waveform and single carrier based waveform are supported in DL for a system operating above a 52.6 GHz carrier frequency, depending on a deployment scenario, UE location, or traffic type, different waveform types can be employed for transmission of a DL signal/channel. In this regard, certain mechanisms can be defined to allow an adaptation of waveform type for DL signal/channel transmission.

The design described herein provides techniques for waveform type and guard interval adaptation for a system operating above the 52.6 GHz carrier frequency. More specifically, the waveform type adaptation can be for a system operating above the 52.6 GHz carrier frequency, and the guard interval length adaptation can be for a system operating above the 52.6 GHz carrier frequency Waveform Type Adaptation for System Operating Above 52.6 GHz Carrier Frequency In one example, both a CP-OFDM waveform and a single carrier waveform can be supported for a system operating above a 52.6 GHz carrier frequency. When both waveforms coexist in the same system, e.g., in the DL, certain mechanisms can be defined to allow adaptation of a waveform for DL signal/channel transmission.

In one example, a default waveform type for a DL physical channel or signal can be defined in the 3GPP specification. For instance, if CP-OFDM and single carrier waveforms (which can include DFT-s-OFDM and/or SC-FDE waveform) are used, a single carrier waveform can be defined as a default waveform in the 3GPP specification, which can provide improved coverage compared to the CP-OFDM waveform.

In one example, the default waveform type can be applied for the transmission of synchronization signals (SS) and a physical broadcast channel (PBCH). In this regard, a UE may not perform blind decoding of different waveforms for SS and PBCH, which can help to reduce receiver complexity and power consumption.

In one example, waveforms used for the transmission of common control messages, including system information, paging and random access response (RAR), etc., can be predefined in the 3GPP specification, or can be implicitly indicated by a SS or explicated indicated in the PBCH. For instance, one bit field in the NR minimum system information (MSI) in the PBCH can be used to indicate the waveform for the transmission of common control messages. More specifically, assuming CP-OFDM and single carrier waveform (e.g., SC-FDE) are supported in the system, bit "1" can indicate that CP-OFDM waveform is applied for the transmission of common control messages while bit "0" can indicate that single carrier waveform is applied for the transmission of common control messages. Further, this field can be included in the reserved bits in the MSI.

Alternatively, the transmission of common control message can follow the same waveform type as used for the transmission of PBCH.

In one example, the waveform type can be determined by a type of radio network temporary ID (RNTI) which is applied to a physical downlink control channel (PDCCH). In one example, for random access RNTI (RA-RNTI), and/or system information RNTI (SI-RNTI), and/or paging RNTI (P-RNTI), and/or temporary cell RNTI (C-RNTI), the default waveform can be used, and for C-RNTI and CS-RNTI, the waveform can be configured by higher layer signaling.

In one example, the waveform type used for the transmission of paging and RAR and other system information (OSI) can be indicated in the NR remaining minimum system information (RMSI). In one option, given that in NR Release-15, an UL waveform including CP-OFDM and DFT-s-OFDM waveform can be indicated by RMSI, a same field can be used to indicate the DL waveform. Further, if DFT-s-OFDM waveform is also used for DL for a system operating above 52.6 GHz, a same field can be used to indicate both DL and UL waveforms, which can imply that a same waveform can be applied for both DL and UL transmission.

Alternatively, independent waveform types can be applied for DL and UL transmission. In this case, a joint or separate field can be included in the MSI and/or RMSI to indicate the DL and UL waveform. For instance, a CP-OFDM waveform can be applied for DL transmission and a DFT-s-OFDM waveform can be applied for UL transmission.

In one example, the UE can report capability information to indicate whether the UE can support one or more waveform types for DL transmission. When the UE supports more than one DL waveform types, a gNB can configure the DL waveform by UE specific RRC signalling. When the UE is not configured with the DL waveform by RRC signalling, the UE can use the indication in the RMSI for DL signal/channel reception.

In one example, same or different DL waveform types can be configured for the transmission of a physical downlink control channel (PDCCH), a physical downlink shared channel (PDSCH) and reference signals.

In one example, when downlink control information (DCI) format 1_0 or fall-back DCI is used to schedule the PDSCH transmission, the UE can follow the DL waveform type as configured by RMSI for PDSCH reception. When DCI format 1_1 or non-fall-back DCI is used to schedule the PDSCH transmission, the UE can follow the DL waveform type as configured by UE specific RRC signaling for PDSCH reception.

In one example, a DL waveform type can be associated with a DL bandwidth part (BWP). In particular, the DL waveform type can be configured together with subcarrier spacing, cyclic prefix (CP) type, etc.

In one example, prior to a RRC configuration, a DL waveform type for transmission of Message 4 during a 4-step random access (RACH) procedure can be predefined in the 3GPP LTE specification, indicated by RMSI and/or indicated by a random access response (RAR). Alternatively, the DL waveform type can follow the same DL waveform type for the transmission of MSI, RMSI and/or RAR Guard Interval Adaptation for System Operating Above 52.6 GHz Carrier Frequency In one example, for an SC-FDE based waveform, a known sequence (guard interval (GI), unique word (UW), etc.) can be inserted at both the beginning and end of one block. Further, a linear equalizer in the frequency domain can be employed to reduce the receiver complexity. Depending on channel conditions and a deployment scenario, a guard interval length can be adapted for a system operating above 52.6 GHz carrier frequency. For instance, for a channel with relatively small delay spread, a shorter guard interval length can be employed so as to allow greater resources for data transmission, and thereby improve a data rate and spectrum efficiency.

Figure 4:
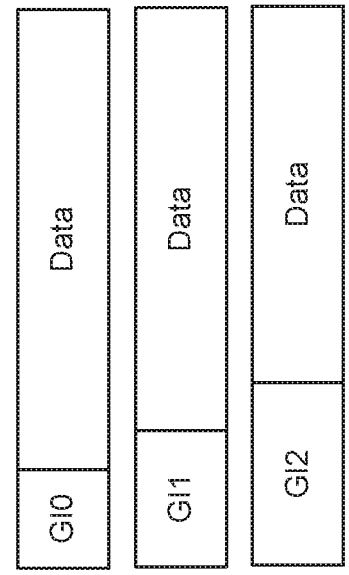
FIG. 4 illustrates various guard interval (GI) lengths in accordance with an example.

FIG. 4 illustrates an example of various guard interval (GI) lengths. In this example, three different GI lengths can be defined to handle different channel conditions or deployment scenarios. For example, $GI_0$ can have a length that is less than $GI_1$ and $GI_2$, where $GI_1$ can have a length that is less than $GI_2$.

As described herein, the terms "guard interval", "unique word" or "known sequence" can be exchangeable.

In one example, a cell specific guard interval length can be either indicated by an SS or configured by MSI or RMSI. More specifically, K guard interval lengths can be predefined in the 3GPP specification and one field in the RMSI can be used to indicate one guard interval length for system operation, where K is a positive integer. In another example, a guard interval length can be configured by higher layers via radio resource control (RRC) signalling in a UE specific manner.

In one example, a non-uniform guard interval length can be employed within one slot or within one transmission time interval. For example, a guard interval with a longer duration can be inserted before one block and multiple short guard interval can be inserted within one block or within one slot or within one transmission time interval.

FIG. 5 illustrates an example of non-uniform GI lengths within one slot. In this example, two GI lengths are defined—$GI_A$ and $GI_B$. Here, $GI_A$ can be within a longer GI length and can be located at a beginning of one slot, and $GI_B$ can be within a shorter GI length and can be located at a beginning of each block. To maintain the SC-FDE property, a GI with a shorter duration should be a subset of a GI with a longer duration.

In one example, a guard interval length can be configured as part of a BWP configuration. The BWP configuration can be indicated by MSI for an initial DL BWP and configured by RMSI for an initial UL BWP. Further, the UE can be configured by UE specific RRC signalling for a dedicated BWP configuration.

FIG. 6 illustrates an example of Abstract Syntax Notation (ASN) code for a bandwidth part (BWP) configuration. The BWP configuration can be for an SC-FDE waveform with a guard interval. In this example, a 'guardIntervalLength' parameter can be configured together with frequency location, and subcarrier spacing for the BWP configuration for a system operating above a 52.6 GHz carrier frequency.

In one example, a guard interval length can be configured per downlink signal and/or signal resource. In one example, different guard interval lengths can be configured for different CORESETs (sets of physical resources), search space, PDSCH, channel state information reference signal (CSI-RS) resource and/or CSI-RS resource set.

In one example, in one transmission occasion, a phase tracking reference signal (PT-RS) density can be determined by the guard interval length.

FIG. 7 is an example of a table of phase tracking reference signal (PT-RS) densities and corresponding guard interval lengths. For example, a PT-RS density selection can be made for different guard interval lengths, where GI-len0<GI-len1<GI-len2 and Density0<Density1<Density2, and PT-RS density can be defined as one PT-RS symbol per transmission interval.

In one configuration, a technique for wireless communication in a fifth generation (5G) or new radio (NR) system is described. A gNodeB (gNB) can indicate a downlink (DL) waveform type for a transmission of downlink physical channels and/or signals. The gNB can transmit the downlink physical channels and/or signals in accordance with the indicated downlink waveform type.

In one example, the DL waveform type can be one or more of cyclic prefix—orthogonal frequency-division multiplexing (CP-OFDM), Discrete Fourier Transform-spread-OFDM (DFT-s-OFDM), single carrier waveform, etc. In another example, a default waveform type for a DL physical channel or signal can be defined in the 3GPP specification, and the default waveform type can be applied for a transmission of synchronization signals (SS) and a physical broadcast channel (PBCH). In yet another example, waveforms used for a transmission of common control messages, including system information, paging and random access response (RAR), etc., can be predefined in the 3GPP specification, or can be implicitly indicated by the SS or explicated indicated in the PBCH.

In one example, transmission of the common control message can follow a same waveform type as used for transmission of the PBCH In another example, a waveform type used for the transmission of paging and a random access response (RAR) and other system information (OSI) can be indicated in an NR remaining minimum system information (RMSI). In yet another example, a UE can report capability information that indicates whether the UE can support one or more waveform types for DL transmission. When the UE supports more than one DL waveform types, the gNB can configure the DL waveform by UE specific RRC signalling In one example, when downlink control information (DCI) format 1_0 or fall-back DCI is used to schedule a physical downlink shared channel (PDSCH) transmission, the UE can follow the DL waveform type as configured by a RMSI for PDSCH reception. In another example, when DCI format 1_1 or non-fall-back DCI is used to schedule the PDSCH transmission, the UE can follow the DL waveform type as configured by the UE specific RRC signaling for PDSCH reception. In yet another example, the DL waveform type can be associated with a DL bandwidth part (BWP).

In one example, prior to a radio resource control (RRC) configuration, a DL waveform type for transmission of Message 4 during a 4-step random access (RACH) procedure can be predefined in the 3GPP specification, indicated by a RMSI and/or indicated by a RAR. In another example, a cell specific guard interval length can be either indicated by an SS or configured by MSI or RMSI, wherein K guard interval lengths can be predefined in the 3GPP specification and one field in the RMSI can be used to indicate one guard interval length for system operation. In yet another example, a guard interval length can be configured by higher layers via RRC signalling in a UE specific manner.

Figure 8:
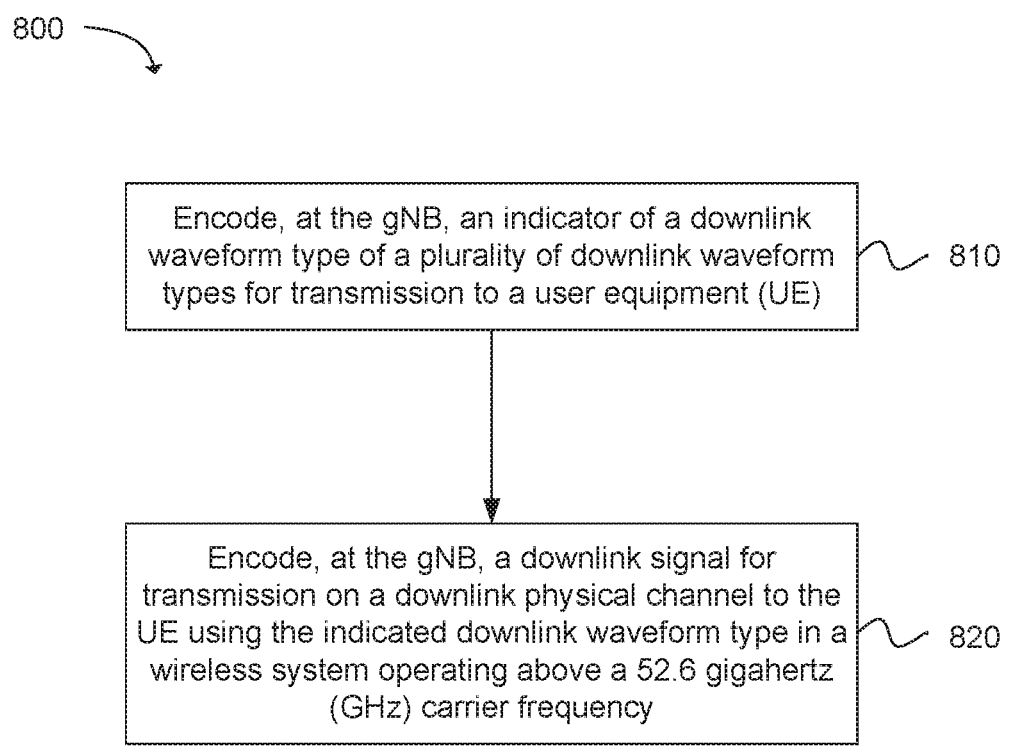
FIG. 8 depicts functionality of a Next Generation NodeB (gNB) operable to adapt to a downlink waveform type for wireless transmissions in accordance with an example.

In one example, a non-uniform guard interval length can be employed within one slot or within one transmission time interval. In another example, a guard interval length can be configured as part of a BWP configuration. In yet another example, a guard interval length can be configured per a downlink signal and/or signal resource. In a further example, in one transmission occasion, a phase tracking reference signal (PT-RS) density can be determined by the guard interval length Another example provides functionality 800 of a Next Generation NodeB (gNB) operable to adapt to a downlink waveform type for wireless transmissions, as shown in FIG. 8. The gNB can comprise one or more processors configured to encode, at the gNB, an indicator of a downlink waveform type of a plurality of downlink waveform types for transmission to a user equipment (UE), as in block 810. The gNB can comprise one or more processors configured to encode, at the gNB, a downlink signal for transmission on a downlink physical channel to the UE using the indicated downlink waveform type in a wireless system operating above a 52.6 gigahertz (GHz) carrier frequency, as in block 820. In addition, the gNB can comprise a memory interface configured to retrieve from a memory the indicator of the downlink waveform type.

Figure 9:
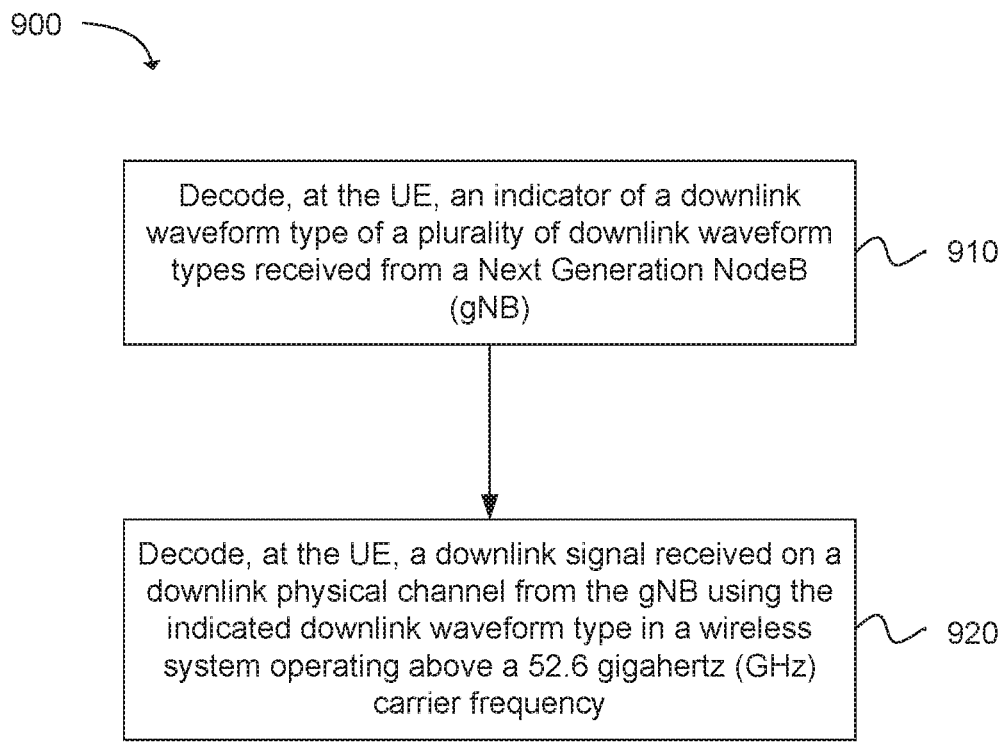
FIG. 9 depicts functionality of a user equipment (UE) operable to decode downlink signals having a downlink waveform type in accordance with an example.

Another example provides functionality 900 of a user equipment (UE) operable to decode downlink signals having a downlink waveform type, as shown in FIG. 9. The UE can comprise one or more processors configured to decode, at the UE, an indicator of a downlink waveform type of a plurality of downlink waveform types received from a Next Generation NodeB (gNB), as in block 910. The UE can comprise one or more processors configured to decode, at the UE, a downlink signal received on a downlink physical channel from the gNB using the indicated downlink waveform type in a wireless system operating above a 52.6 gigahertz (GHz) carrier frequency, as in block 920. In addition, the UE can comprise a memory interface configured to send to a memory the indicator of the downlink waveform type.

Figure 10:
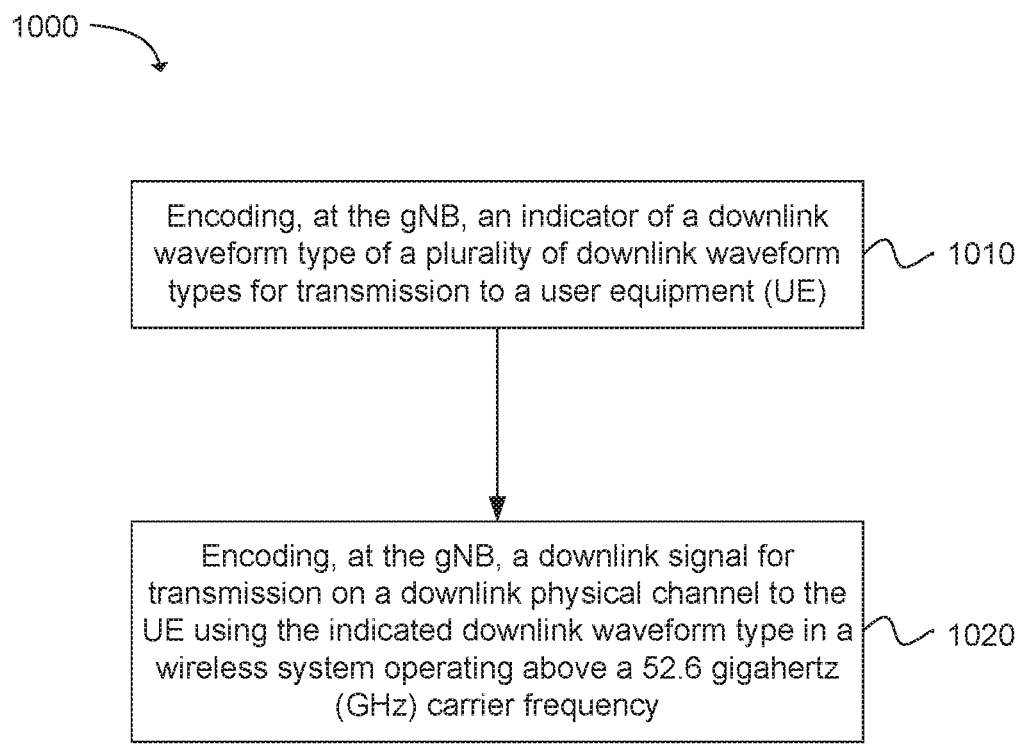
FIG. 10 depicts a flowchart of a machine readable storage medium having instructions embodied thereon for adapting to a downlink waveform type for wireless transmissions in accordance with an example.

Another example provides at least one machine readable storage medium having instructions 1000 embodied thereon for adapting to a downlink waveform type for wireless transmissions, as shown in FIG. 10. The instructions can be executed on a machine, where the instructions are included on at least one computer readable medium or one non-transitory machine readable storage medium. The instructions when executed by one or more processors of a Next Generation NodeB (gNB) perform: encoding, at the gNB, an indicator of a downlink waveform type of a plurality of downlink waveform types for transmission to a user equipment (UE), as in block 1010. The instructions when executed by one or more processors of the gNB perform:

encoding, at the gNB, a downlink signal for transmission on a downlink physical channel to the UE using the indicated downlink waveform type in a wireless system operating above a 52.6 gigahertz (GHz) carrier frequency, as in block 1020.

Figure 11:
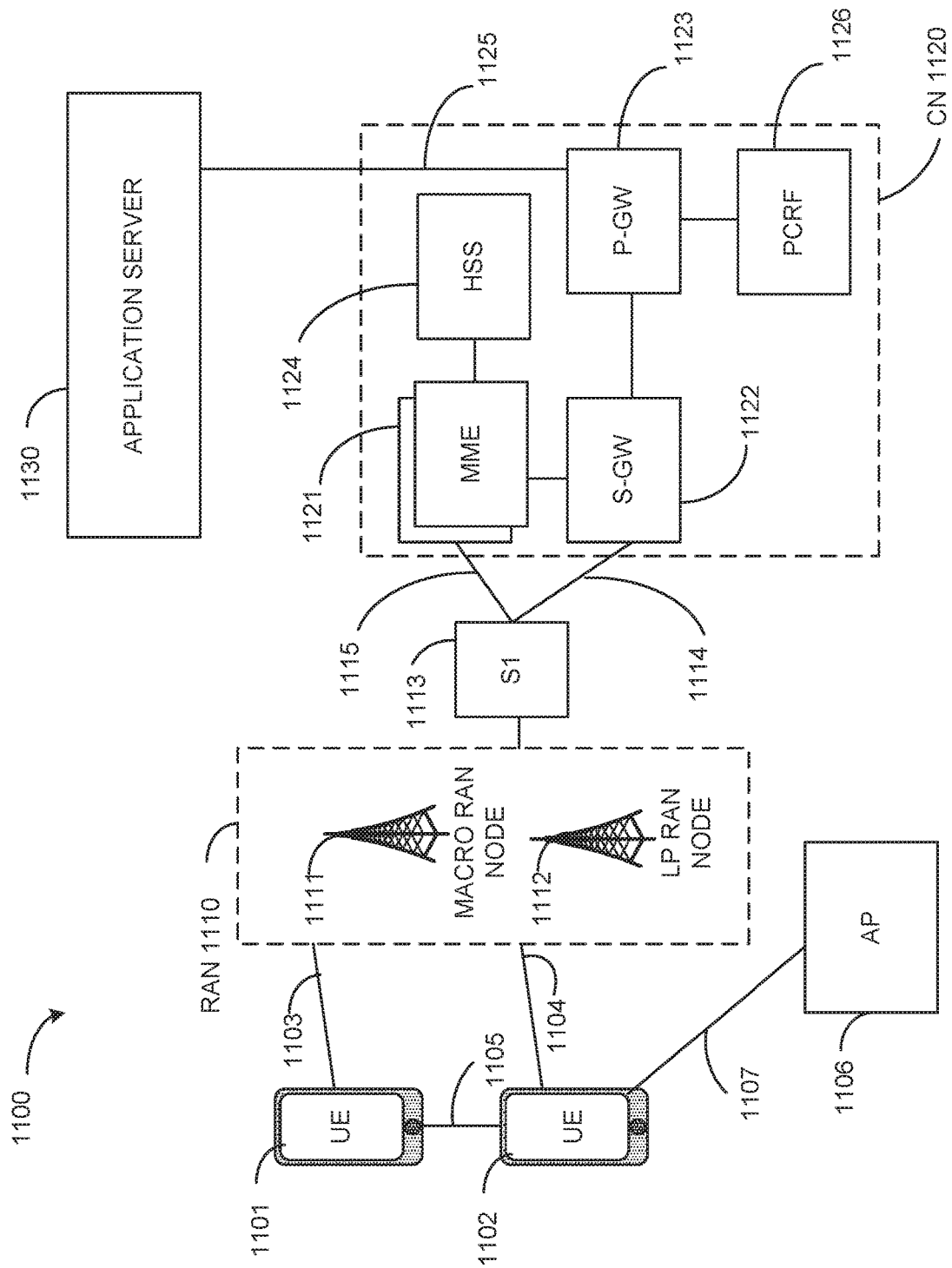
FIG. 11 illustrates an architecture of a wireless network in accordance with an example.

FIG. 11 illustrates an architecture of a system 1100 of a network in accordance with some embodiments. The system 1100 is shown to include a user equipment (UE) 1101 and a UE 1102. The UEs 1101 and 1102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1101 and 1102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1101 and 1102 may be configured to connect, e.g., communicatively couple, with a radio access network (RAN) 1110—the RAN 1110 may be, for example, an Evolved Universal Mobile Telecommunications System (UMTS) Terrestrial Radio Access Network (E-UTRAN), a NextGen RAN (NG RAN), or some other type of RAN. The UEs 1101 and 1102 utilize connections 1103 and 1104, respectively, each of which comprises a physical communications interface or layer (discussed in further detail below); in this example, the connections 1103 and 1104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1101 and 1102 may further directly exchange communication data via a ProSe interface 1105. The Pro Se interface 1105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1102 is shown to be configured to access an access point (AP) 1106 via connection 1107. The connection 1107 can comprise a local wireless connection, such as a connection consistent with any IEEE 1202.15 protocol, wherein the AP 1106 would comprise a wireless fidelity (WiFi®) router. In this example, the AP 1106 is shown to be connected to the Internet without connecting to the core network of the wireless system (described in further detail below).

The RAN 1110 can include one or more access nodes that enable the connections 1103 and 1104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1110 may include one or more RAN nodes for providing macrocells, e.g., macro RAN node 1111, and one or more RAN nodes for providing femtocells or picocells (e.g., cells having smaller coverage areas, smaller user capacity, or higher bandwidth compared to macrocells), e.g., low power (LP) RAN node 1112.

Any of the RAN nodes 1111 and 1112 can terminate the air interface protocol and can be the first point of contact for the UEs 1101 and 1102. In some embodiments, any of the RAN nodes 1111 and 1112 can fulfill various logical functions for the RAN 1110 including, but not limited to, radio network controller (RNC) functions such as radio bearer management, uplink and downlink dynamic radio resource management and data packet scheduling, and mobility management.

In accordance with some embodiments, the UEs 1101 and 1102 can be configured to communicate using Orthogonal Frequency-Division Multiplexing (OFDM) communication signals with each other or with any of the RAN nodes 1111 and 1112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1111 and 1112 to the UEs 1101 and 1102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1101 and 1102. The physical downlink control channel (PDCCH) may carry information about the transport format and resource allocations related to the PDSCH channel, among other things. It may also inform the UEs 1101 and 1102 about the transport format, resource allocation, and H-ARQ (Hybrid Automatic Repeat Request) information related to the uplink shared channel. Typically, downlink scheduling (assigning control and shared channel resource blocks to the UE 1102 within a cell) may be performed at any of the RAN nodes 1111 and 1112 based on channel quality information fed back from any of the UEs 1101 and 1102. The downlink resource assignment information may be sent on the PDCCH used for (e.g., assigned to) each of the UEs 1101 and 1102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1110 is shown to be communicatively coupled to a core network (CN) 1120—via an S1 interface 1113. In embodiments, the CN 1120 may be an evolved packet core (EPC) network, a NextGen Packet Core (NPC) network, or some other type of CN. In this embodiment the S1 interface 1113 is split into two parts: the S1-U interface 1114, which carries traffic data between the RAN nodes 1111 and 1112 and the serving gateway (S-GW) 1122, and the S1-mobility management entity (MME) interface 1115, which is a signaling interface between the RAN nodes 1111 and 1112 and MMEs 1121.

In this embodiment, the CN 1120 comprises the MMEs 1121, the S-GW 1122, the Packet Data Network (PDN) Gateway (P-GW) 1123, and a home subscriber server (HSS) 1124. The MMEs 1121 may be similar in function to the control plane of legacy Serving General Packet Radio Service (GPRS) Support Nodes (SGSN). The MMEs 1121 may manage mobility aspects in access such as gateway selection and tracking area list management. The HSS 1124 may comprise a database for network users, including subscription-related information to support the network entities' handling of communication sessions. The CN 1120 may comprise one or several HSSs 1124, depending on the number of mobile subscribers, on the capacity of the equipment, on the organization of the network, etc. For example, the HSS 1124 can provide support for routing/roaming, authentication, authorization, naming/addressing resolution, location dependencies, etc.

The S-GW 1122 may terminate the S1 interface 1113 towards the RAN 1110, and routes data packets between the RAN 1110 and the CN 1120. In addition, the S-GW 1122 may be a local mobility anchor point for inter-RAN node handovers and also may provide an anchor for inter-3GPP mobility. Other responsibilities may include lawful intercept, charging, and some policy enforcement.

The P-GW 1123 may terminate an SGi interface toward a PDN. The P-GW 1123 may route data packets between the EPC network 1123 and external networks such as a network including the application server 1130 (alternatively referred to as application function (AF)) via an Internet Protocol (IP) interface 1125. Generally, the application server 1130 may be an element offering applications that use IP bearer resources with the core network (e.g., UMTS Packet Services (PS) domain, LTE PS data services, etc.). In this embodiment, the P-GW 1123 is shown to be communicatively coupled to an application server 1130 via an IP communications interface 1125. The application server 1130 can also be configured to support one or more communication services (e.g., Voice-over-Internet Protocol (VoIP) sessions, PTT sessions, group communication sessions, social networking services, etc.) for the UEs 1101 and 1102 via the CN 1120.

The P-GW 1123 may further be a node for policy enforcement and charging data collection. Policy and Charging Enforcement Function (PCRF) 1126 is the policy and charging control element of the CN 1120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1126 may be communicatively coupled to the application server 1130 via the P-GW 1123. The application server 1130 may signal the PCRF 1126 to indicate a new service flow and select the appropriate Quality of Service (QoS) and charging parameters. The PCRF 1126 may provision this rule into a Policy and Charging Enforcement Function (PCEF) (not shown) with the appropriate traffic flow template (TFT) and QoS class of identifier (QCI), which commences the QoS and charging as specified by the application server 1130.

Figure 12:
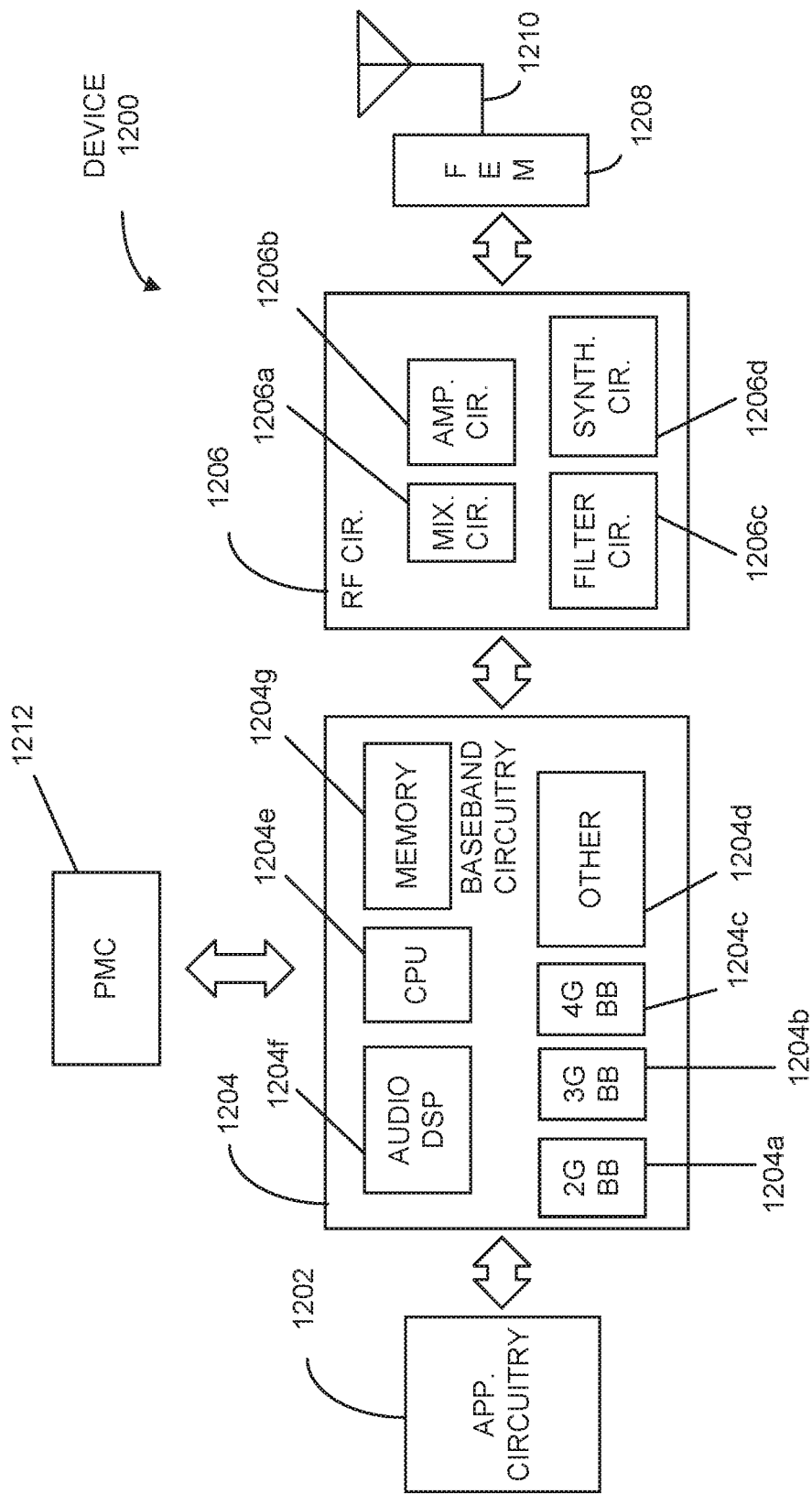
FIG. 12 illustrates a diagram of a wireless device (e.g., UE) in accordance with an example.

FIG. 12 illustrates example components of a device 1200 in accordance with some embodiments. In some embodiments, the device 1200 may include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 may be included in a UE or a RAN node. In some embodiments, the device 1200 may include less elements (e.g., a RAN node may not utilize application circuitry 1202, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1206 and to generate baseband signals for a transmit signal path of the RF circuitry 1206. Baseband circuitry 1204 may interface with the application circuitry 1202 for generation and processing of the baseband signals and for controlling operations of the RF circuitry 1206. For example, in some embodiments, the baseband circuitry 1204 may include a third generation (3G) baseband processor 1204*a*, a fourth generation (4G) baseband processor 1204*b*, a fifth generation (5G) baseband processor 1204*c*, or other baseband processor(s) 1204*d* for other existing generations, generations in development or to be developed in the future (e.g., second generation (2G), sixth generation (6G), etc.). The baseband circuitry 1204 (e.g., one or more of baseband processors 1204*a-d*) may handle various radio control functions that enable communication with one or more radio networks via the RF circuitry 1206. In other embodiments, some or all of the functionality of baseband processors 1204*a-d* may be included in modules stored in the memory 1204*g* and executed via a Central Processing Unit (CPU) 1204*e*. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include one or more audio digital signal processor(s) (DSP) 1204*f*. The audio DSP(s) 1204*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the receive signal path of the RF circuitry 1206 may include mixer circuitry 1206*a*, amplifier circuitry 1206*b* and filter circuitry 1206*c*. In some embodiments, the transmit signal path of the RF circuitry 1206 may include filter circuitry 1206*c* and mixer circuitry 1206*a*. RF circuitry 1206 may also include synthesizer circuitry 1206*d* for synthesizing a frequency for use by the mixer circuitry 1206*a* of the receive signal path and the transmit signal path. In some embodiments, the mixer circuitry 1206*a* of the receive signal path may be configured to down-convert RF signals received from the FEM circuitry 1208 based on the synthesized frequency provided by synthesizer circuitry 1206*d*. The amplifier circuitry 1206*b* may be configured to amplify the down-converted signals and the filter circuitry 1206*c* may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, mixer circuitry 1206*a* of the receive signal path may comprise passive mixers, although the scope of the embodiments is not limited in this respect.

In some embodiments, the mixer circuitry 1206*a* of the transmit signal path may be configured to up-convert input baseband signals based on the synthesized frequency provided by the synthesizer circuitry 1206*d* to generate RF output signals for the FEM circuitry 1208. The baseband signals may be provided by the baseband circuitry 1204 and may be filtered by filter circuitry 1206*c*.

In some embodiments, the mixer circuitry 1206*a* of the receive signal path and the mixer circuitry 1206*a* of the transmit signal path may include two or more mixers and may be arranged for quadrature downconversion and upconversion, respectively. In some embodiments, the mixer circuitry 1206*a* of the receive signal path and the mixer circuitry 1206*a* of the transmit signal path may include two or more mixers and may be arranged for image rejection (e.g., Hartley image rejection). In some embodiments, the mixer circuitry 1206*a* of the receive signal path and the mixer circuitry 1206*a* may be arranged for direct downconversion and direct upconversion, respectively. In some embodiments, the mixer circuitry 1206*a* of the receive signal path and the mixer circuitry 1206*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206*d* may be a fractional-N synthesizer or a fractional N/N+1 synthesizer, although the scope of the embodiments is not limited in this respect as other types of frequency synthesizers may be suitable. For example, synthesizer circuitry 1206*d* may be a delta-sigma synthesizer, a frequency multiplier, or a synthesizer comprising a phase-locked loop with a frequency divider.

The synthesizer circuitry 1206*d* may be configured to synthesize an output frequency for use by the mixer circuitry 1206*a* of the RF circuitry 1206 based on a frequency input and a divider control input. In some embodiments, the synthesizer circuitry 1206*d* may be a fractional N/N+1 synthesizer.

In some embodiments, frequency input may be provided by a voltage controlled oscillator (VCO), although that is not a requirement. Divider control input may be provided by either the baseband circuitry 1204 or the application circuitry 1202 depending on the desired output frequency. In some embodiments, a divider control input (e.g., N) may be determined from a look-up table based on a channel indicated by the application circuitry 1202.

Synthesizer circuitry 1206*d* of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210. In various embodiments, the amplification through the transmit or receive signal paths may be done solely in the RF circuitry 1206, solely in the FEM circuitry 1208, or in both the RF circuitry 1206 and the FEM circuitry 1208.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210).

In some embodiments, the PMC 1212 may manage power provided to the baseband circuitry 1204. In particular, the PMC 1212 may control power-source selection, voltage scaling, battery charging, or DC-to-DC conversion. The PMC 1212 may often be included when the device 1200 is capable of being powered by a battery, for example, when the device is included in a UE. The PMC 1212 may increase the power conversion efficiency while providing desirable implementation size and heat dissipation characteristics.

While FIG. 12 shows the PMC 1212 coupled only with the baseband circuitry 1204. However, in other embodiments, the PMC 1212 may be additionally or alternatively coupled with, and perform similar power management operations for, other components such as, but not limited to, application circuitry 1202, RF circuitry 1206, or FEM circuitry 1208.

In some embodiments, the PMC 1212 may control, or otherwise be part of, various power saving mechanisms of the device 1200. For example, if the device 1200 is in an RRC Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used execute Layer 3, Layer 2, or Layer 1 functionality, while processors of the application circuitry 1204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
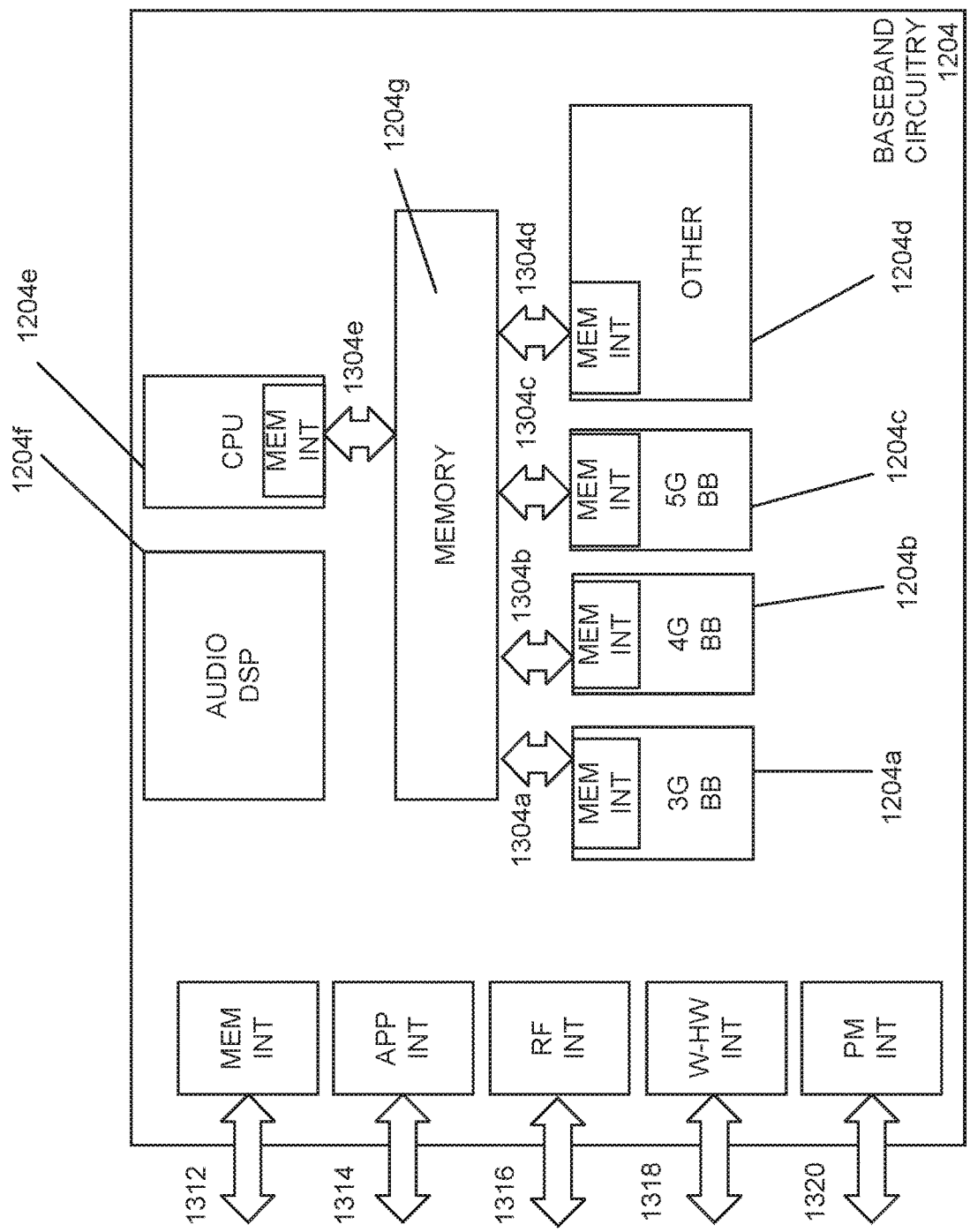
FIG. 13 illustrates interfaces of baseband circuitry in accordance with an example.

FIG. 13 illustrates example interfaces of baseband circuitry in accordance with some embodiments. As discussed above, the baseband circuitry 1204 of FIG. 12 may comprise processors 1204a-1204e and a memory 1204g utilized by said processors. Each of the processors 1204a-1204e may include a memory interface, 1304a-1304e, respectively, to send/receive data to/from the memory 1204g.

The baseband circuitry 1204 may further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 1202 of FIG. 12), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212.

Figure 14:
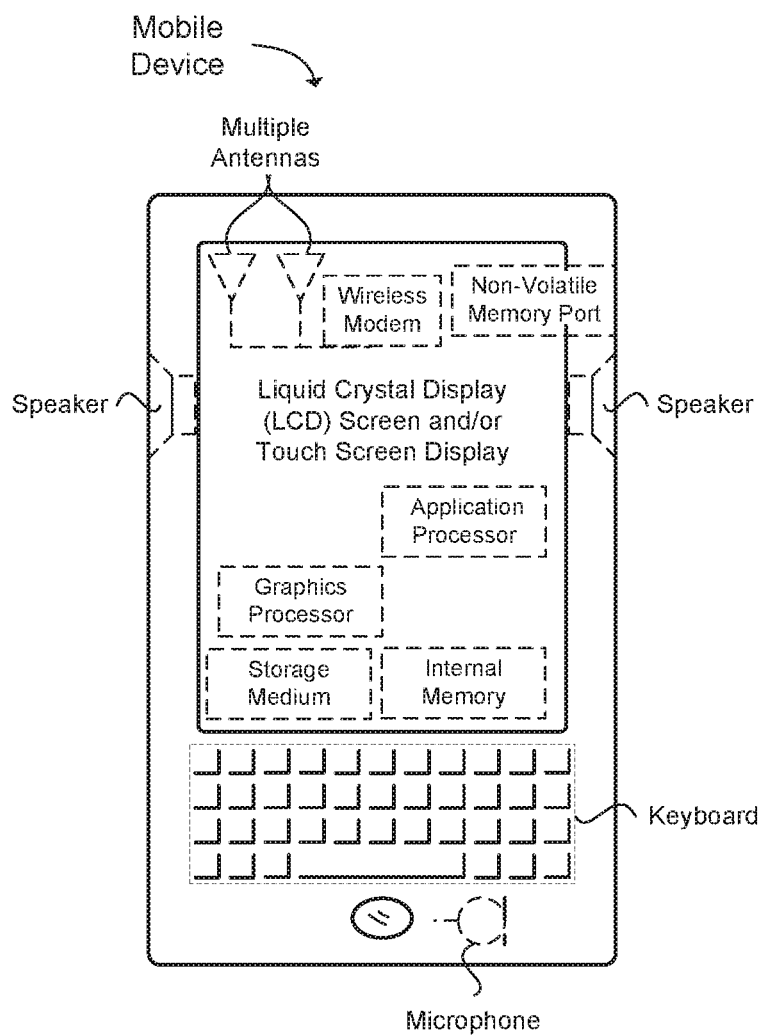
FIG. 14 illustrates a diagram of a wireless device (e.g., UE) in accordance with an example.

FIG. 14 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 14 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a Next Generation NodeB (gNB) operable to adapt to a downlink waveform type for wireless transmissions, the apparatus comprising: one or more processors configured to: encode, at the gNB, an indicator of a downlink waveform type of a plurality of downlink waveform types for transmission to a user equipment (UE); and encode, at the gNB, a downlink signal for transmission on a downlink physical channel to the UE using the indicated downlink waveform type in a wireless system operating above a 52.6 gigahertz (GHz) carrier frequency; and a memory interface configured to retrieve from a memory the indicator of the downlink waveform type.

Example 2 includes the apparatus of Example 1, further comprising a transceiver configured to: transmit the indicator of the downlink waveform type to the UE; and transmit the downlink signal to the UE.

Example 3 includes the apparatus of any of Examples 1 to 2, wherein the downlink waveform type of the plurality of downlink waveform types is one of a cyclic prefix—orthogonal frequency-division multiplexing (CP-OFDM) waveform, a Discrete Fourier Transform-spread-OFDM (DFT-s-OFDM) waveform, or a single carrier waveform.

Example 4 includes the apparatus of any of Examples 1 to 3, wherein the downlink physical channel includes a physical broadcast channel (PBCH), and the downlink signal is associated with one or more of a synchronization signal (SS), system information, a paging message or a random access response (RAR), wherein the indicator of the downlink waveform type is predefined or implicitly indicated in the SS or explicitly indicated in the PBCH.

Example 5 includes the apparatus of any of Examples 1 to 4, wherein the one or more processors are configured to encode the indicator of the downlink waveform type for transmission in one of minimum system information (MSI), remaining minimum system information (RMSI), or UE specific radio resource control (RRC) signaling.

Example 6 includes the apparatus of any of Examples 1 to 5, wherein the one or more processors are further configured: encode an indicator of a guard interval length of a plurality of guard interval lengths for transmission to the UE; and encode the downlink signal for transmission on the downlink physical channel to the UE using the indicated guard interval length in the wireless system operating above a 52.6 gigahertz (GHz) carrier frequency.

Example 7 includes the apparatus of any of Examples 1 to 6, wherein the one or more processors are configured to encode the indicator of the guard interval length for transmission via a synchronization signal (SS), minimum system information (MSI) or remaining minimum system information (RMSI), wherein the guard interval length is a cell specific guard interval length.

Example 8 includes the apparatus of any of Examples 1 to 7, wherein the one or more processors are configured to encode the indicator of the guard interval length for transmission by higher layers via radio resource control (RRC) signaling in a UE specific manner.

Example 9 includes the apparatus of any of Examples 1 to 8, wherein the guard interval length is a non-uniform guard interval length that is used within one slot or within one transmission time interval (TTI).

Example 10 includes the apparatus of any of Examples 1 to 9, wherein the one or more processors are configured to encode a bandwidth part (BWP) configuration for transmission to the UE that includes the indicator of the guard interval length.

Example 11 includes the apparatus of any of Examples 1 to 10, wherein the one or more processors are configured to determine a phase tracking reference signal (PT-RS) density in one transmission occasion based on the guard interval length.

Example 12 includes the apparatus of any of Examples 1 to 11, wherein the one or more processors are configured to decode a UE capability message received from the UE, wherein the UE capability message indicates one or more downlink waveform types of the plurality of downlink waveform types that are supported at the UE.

Example 13 includes the apparatus of any of Examples 1 to 12, wherein the one or more processors are configured to schedule a physical downlink shared channel (PDSCH) transmission using downlink control information (DCI) format 1_0 or 1_1 or fallback or non-fallback DCI, and the indicated downlink waveform type is used for a PDSCH reception at the UE.

Example 14 includes an apparatus of a user equipment (UE) operable to decode downlink signals having a downlink waveform type, the apparatus comprising: one or more processors configured to: decode, at the UE, an indicator of a downlink waveform type of a plurality of downlink waveform types received from a Next Generation NodeB (gNB); and decode, at the UE, a downlink signal received on a downlink physical channel from the gNB using the indicated downlink waveform type in a wireless system operating above a 52.6 gigahertz (GHz) carrier frequency; and a memory interface configured to send to a memory the indicator of the downlink waveform type.

Example 15 includes the apparatus of Example 14, wherein the downlink waveform type of the plurality of downlink waveform types is one of a cyclic prefix—orthogonal frequency-division multiplexing (CP-OFDM) waveform, a Discrete Fourier Transform-spread-OFDM (DFT-s-OFDM) waveform, or a single carrier waveform.

Example 16 includes the apparatus of any of Examples 14 to 15, wherein the downlink physical channel includes a physical broadcast channel (PBCH), and the downlink signal is associated with one or more of a synchronization signal (SS), system information, a paging message or a random access response (RAR), wherein the indicator of the downlink waveform type is predefined or implicitly indicated in the SS or explicitly indicated in the PBCH.

Example 17 includes the apparatus of any of Examples 14 to 16, wherein the one or more processors are configured to encode the indicator of the downlink waveform type for transmission in one of minimum system information (MSI), remaining minimum system information (RMSI), or UE specific radio resource control (RRC) signaling.

Example 18 includes the apparatus of any of Examples 14 to 17, wherein the one or more processors are further configured: decode an indicator of a guard interval length of a plurality of guard interval lengths received from the gNB; and decode the downlink signal received on the downlink physical channel from the gNB using the indicated guard interval length in the wireless system operating above a 52.6 gigahertz (GHz) carrier frequency.

Example 19 includes the apparatus of any of Examples 14 to 18, wherein the one or more processors are configured to: decode the indicator of the guard interval length received from the gNB by higher layers via radio resource control (RRC) signaling in a UE specific manner; or decode a bandwidth part (BWP) configuration received from the gNB that includes the indicator of the guard interval length.

Example 20 includes at least one machine readable storage medium having instructions embodied thereon for adapting to a downlink waveform type for wireless transmissions, the instructions when executed by one or more processors at a Next Generation NodeB (gNB) perform the following: encoding, at the gNB, an indicator of a downlink waveform type of a plurality of downlink waveform types for transmission to a user equipment (UE); and encoding, at the gNB, a downlink signal for transmission on a downlink physical channel to the UE using the indicated downlink waveform type in a wireless system operating above a 52.6 gigahertz (GHz) carrier frequency.

Example 21 includes the at least one machine readable storage medium of claim 20, further comprising instructions when executed perform the following: encoding an indicator of a guard interval length of a plurality of guard interval lengths for transmission to the UE; and encoding the downlink signal for transmission on the downlink physical channel to the UE using the indicated guard interval length in the wireless system operating above a 52.6 gigahertz (GHz) carrier frequency.

Example 22 includes the at least one machine readable storage medium of Example 21, further comprising instructions when executed perform the following: encoding the indicator of the guard interval length for transmission via a synchronization signal (SS), minimum system information (MSI) or remaining minimum system information (RMSI), wherein the guard interval length is a cell specific guard interval length.

Example 23 includes the at least one machine readable storage medium of any of Examples 21 to 22, wherein the guard interval length is a non-uniform guard interval length that is used within one slot or within one transmission time interval (TTI).

Example 24 includes the at least one machine readable storage medium of any of Examples 21 to 23, further comprising instructions when executed perform the following: determining a phase tracking reference signal (PT-RS) density in one transmission occasion based on the guard interval length.

Example 25 includes the at least one machine readable storage medium of any of Examples 21 to 24, further comprising instructions when executed perform the following: decoding a UE capability message received from the UE, wherein the UE capability message indicates one or more downlink waveform types of the plurality of downlink waveform types that are supported at the UE.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a Next Generation NodeB (gNB) operable to adapt to a downlink waveform type of a plurality of downlink waveform types for wireless transmissions, the apparatus comprising:
one or more processors configured to:
encode, at the gNB, an indicator of the downlink waveform type of the plurality of downlink waveform types for transmission to a user equipment (UE);
encode, at the gNB, an indicator of a guard interval length of a plurality of guard interval lengths for transmission to the UE, wherein the guard interval length is a non-uniform guard interval length that is used within one slot or within one transmission time interval (TTI); and encode, at the gNB, a downlink signal for transmission on a downlink physical channel to the UE using the downlink waveform type corresponding to the indicator of the downlink waveform type and using the indicated guard interval length in a wireless system operating above a 52.6 gigahertz (GHz) carrier frequency; and a memory interface configured to retrieve from a memory the indicator of the downlink waveform type and the indicator of the guard interval length.

2. The apparatus of claim 1, wherein the downlink waveform type of the plurality of downlink waveform types is one of a cyclic prefix-orthogonal frequency-division multiplexing (CP-OFDM) waveform, a Discrete Fourier Transform-spread-OFDM (DFT-s-OFDM) waveform, or a single carrier waveform.

3. The apparatus of claim 1, wherein the downlink physical channel includes a physical broadcast channel (PBCH), and the downlink signal is associated with one or more of a synchronization signal (SS), system information, a paging message or a random access response (RAR), wherein the indicator of the downlink waveform type is predefined or implicitly indicated in the SS or explicitly indicated in the PBCH.

4. The apparatus of claim 1, wherein the one or more processors are configured to encode the indicator of the downlink waveform type for transmission in one of minimum system information (MSI), remaining minimum system information (RMSI), or UE specific radio resource control (RRC) signaling.

5. The apparatus of claim 1, wherein the one or more processors are configured to encode the indicator of the guard interval length for transmission via a synchronization signal (SS), minimum system information (MSI) or remaining minimum system information (RMSI), wherein the guard interval length is a cell specific guard interval length.

6. The apparatus of claim 1, wherein the one or more processors are configured to encode the indicator of the guard interval length for transmission by higher layers via radio resource control (RRC) signaling in a UE specific manner.

7. The apparatus of claim 1, wherein the one or more processors are configured to encode a bandwidth part (BWP) configuration for transmission to the UE that includes the indicator of the guard interval length.

8. The apparatus of claim 1, wherein the one or more processors are configured to determine a phase tracking reference signal (PT-RS) density in one transmission occasion based on the guard interval length.

9. The apparatus of claim 1, wherein the one or more processors are configured to decode a UE capability message received from the UE, wherein the UE capability message indicates one or more supported downlink waveform types of the plurality of downlink waveform types that are supported at the UE.

10. The apparatus of claim 1, wherein the one or more processors are configured to schedule a physical downlink shared channel (PDSCH) transmission using downlink control information (DCI) format 1_0 or 1_1 or fallback or non-fallback DCI, and the indicated downlink waveform type is used for a PDSCH reception at the UE.

11. An apparatus of a user equipment (UE) operable to decode downlink signals having a downlink waveform type of a plurality of downlink waveform types, the apparatus comprising:

one or more processors configured to:
decode, at the UE, an indicator of the downlink waveform type of the plurality of downlink waveform types received from a Next Generation NodeB (gNB);
decode, at the UE, an indicator of a guard interval length of a plurality of guard interval lengths received from the gNB, wherein the guard interval length is a non-uniform guard interval length that is used within one slot or within one transmission time interval (TTI); and
decode, at the UE, a downlink signal received on a downlink physical channel from the gNB using the downlink waveform type corresponding to the indicator of the downlink waveform type and using the indicated guard interval length in a wireless system operating above a 52.6 GHz carrier frequency; and
a memory interface configured to send to a memory the indicator of the downlink waveform type.

12. The apparatus of claim 11, wherein the downlink waveform type of the plurality of downlink waveform types is one of a cyclic prefix-orthogonal frequency-division multiplexing (CP-OFDM) waveform, a Discrete Fourier Transform-spread-OFDM (DFT-s-OFDM) waveform, or a single carrier waveform.

13. The apparatus of claim 11, wherein the downlink physical channel includes a physical broadcast channel (PBCH), and the downlink signal is associated with one or more of a synchronization signal (SS), system information, a paging message or a random access response (RAR), wherein the indicator of the downlink waveform type is predefined or implicitly indicated in the SS or explicitly indicated in the PBCH.

14. The apparatus of claim 11, wherein the one or more processors are further configured to encode the indicator of the downlink waveform type for transmission in one of minimum system information (MSI), remaining minimum system information (RMSI), or UE specific radio resource control (RRC) signaling.

15. The apparatus of claim 11, wherein the one or more processors are further configured to:
decode the indicator of the guard interval length received from the gNB by higher layers via radio resource control (RRC) signaling in a UE specific manner; or
decode a bandwidth part (BWP) configuration received from the gNB that includes the indicator of the guard interval length.

16. At least one non-transitory machine readable storage medium having instructions embodied thereon for adapting to a downlink waveform type of a plurality of downlink waveform types for wireless transmissions, the instructions when executed by one or more processors at a Next Generation NodeB (gNB) perform the following:
encoding, at the gNB, an indicator of the downlink waveform type of the plurality of downlink waveform types for transmission to a user equipment (UE);
encoding, at the gNB, an indicator of a guard interval length of a plurality of guard interval lengths for transmission to the UE, wherein the guard interval length is a non-uniform guard interval length that is used within one slot or within one transmission time interval (TTI); and
encoding, at the gNB, a downlink signal for transmission on a downlink physical channel to the UE using the downlink waveform type corresponding to the indicator of the downlink waveform type and using the indicated guard interval length in a wireless system operating above a 52.6 gigahertz (GHz) carrier frequency.

\* \* \* \* \*